(12) United States Patent
Daggett

(10) Patent No.: US 7,063,677 B1
(45) Date of Patent: Jun. 20, 2006

(54) PNEUMATIC LUMBAR SUPPORT AND METHOD FOR DEVELOPING IMPROVED LOWER BACK RANGE OF MOTION

(76) Inventor: Jonathan G. Daggett, 6178 W. Alluvial, Fresno, CA (US) 93722

( * ) Notice: Subject to any disclaimer, the term of this patent is extended or adjusted under 35 U.S.C. 154(b) by 366 days.

(21) Appl. No.: 10/693,203

(22) Filed: Oct. 27, 2003

(51) Int. Cl.
*A61F 5/00* (2006.01)

(52) U.S. Cl. ............................ 602/13; 602/14; 602/19; 128/845; 128/870; 5/655.3

(58) Field of Classification Search ................... 602/13, 602/14, 17, 18, 19, 23; 128/845, 846, 857, 128/869, 870, 876; 607/96, 108, 109, 110; 5/631, 636, 640, 644, 645, 648, 630, 632, 5/650, 655.3
See application file for complete search history.

(56) References Cited

U.S. PATENT DOCUMENTS

| | | | | | |
|---|---|---|---|---|---|
| 4,258,706 | A | * | 3/1981 | Shank | .......................... 601/55 |
| 4,916,765 | A | * | 4/1990 | Castronovo, Jr. | ............... 5/640 |
| 5,170,522 | A | * | 12/1992 | Walker | ........................... 5/615 |
| 5,311,625 | A | * | 5/1994 | Barker et al. | ................... 5/615 |
| 5,516,188 | A | * | 5/1996 | Bruhnke et al. | ............. 297/129 |
| 5,577,278 | A | * | 11/1996 | Barker et al. | ................... 5/615 |
| 5,785,669 | A | * | 7/1998 | Proctor et al. | .............. 601/148 |
| 6,117,095 | A | * | 9/2000 | Daggett et al. | ............... 602/19 |
| 6,799,339 | B1 | * | 10/2004 | Stewart | .................. 5/413 AM |
| 6,848,137 | B1 | * | 2/2005 | Barnes | ........................... 5/710 |
| 2004/0143906 | A1 | * | 7/2004 | Kasatshko et al. | ............. 5/713 |
| 2005/0155154 | A1 | * | 7/2005 | Kasatshko et al. | ............. 5/713 |

\* cited by examiner

*Primary Examiner*—Henry Bennett
*Assistant Examiner*—Kari Petrik
(74) *Attorney, Agent, or Firm*—John D. Gugliotta; Olen L. York, III

(57) ABSTRACT

A portable and adjustable pneumatic lumbar support is provided having a back section and a leg section adjacent to the back section. A first bladder in the back section inflates to support said user's torso. A second bladder in the leg section supports the user's legs. An air compressor integrally and operatively coupled with the first and second bladders are selectively capable of separately inflating each bladder. A temperature control region integral to the back section provided for administration of hot or cold therapy.

6 Claims, 2 Drawing Sheets

PNEUMATIC LUMBAR SUPPORT AND METHOD FOR DEVELOPING IMPROVED LOWER BACK RANGE OF MOTION

RELATED APPLICATIONS AND DISCLOSURES

There have been no previously filed, nor any co-pending applications, anywhere in the world.

BACKGROUND OF THE INVENTION

1. Field of the Invention

The present invention relates generally to orthopedic supports, and more particularly, to a portable and adjustable pneumatic lumbar support.

2. Description of the Related Art

Each day, many people strain muscles while performing a task (sitting, standing and lifting), be it at home, in the garden, exercising or resulting from overall poor health of the individual. With the stringent work schedules many have today, eating fast foods and increasing our body weight places our lower backs in a strain, thereby reducing the opportunities to engage in meaningful exercise. Because of these work schedules, exercising has become more of a desire, need and want instead of a daily routine. Without the opportunity to exercise, the fatty foods consumed often results in obesity and further prevents individuals from strengthening our bodies as we should.

In conjunction with these daily issues we tend to become lazy, and unwilling to motivate ourselves to maintain our bodies. This leads to physical ailments and/or injuries, such as muscle pulls or strains or sprains, slipping disks, impinging disks, forward and backward leaning of the body, shoulder slumping or slouching, most of which allows the abdominal muscles, buttocks and tissues to move outward, thereby placing strain on the lower back. Such strains or sprains, ailments and/or injuries ultimately result in visits with a doctor, chiropractor and/or a physical therapist to thoroughly treat and remedy the condition.

Unfortunately, there are a wide variety of insurance schemes that either prohibit or discourage regular visitation to health care professionals. In addition, many people are too preoccupied with work or miscellaneous activities to adequately care for themselves or seek appropriate health care attention. As such, health care, in general, and back care, in particular, are largely ignored until the moment the back area is injured.

Accordingly, there is a need for a means by which one can perform pelvic tilt exercises and stretches on their own, either at home or in the office, as part of a regular exercise regimen or health maintenance routine, without requiring costly services and equipment.

In the related art, several devices are disclosed that describe a back support device. Of particular interest is U.S. Pat. No. 6,117,095, issued in the name of Daggett et al., in which a portable and adjustable pneumatic lumbar support is provided for use on a floor, and is hereby incorporated by reference as if fully rewritten. The benefits and improvement of the Daggett et al. reference show the advantages of utilizing a leg-raising cushion having a hollow, inflatable bladder in linear alignment. Consequently, the present invention builds upon such developments, providing improvements for use in tandem, table top, or institutional applications.

SUMMARY OF THE INVENTION

It is therefore an object of the present invention to provide an improved portable and adjustable pneumatic lumbar support that permits a user with chronic or acute back pain to select and subsequently lie in a customized neutral lumbar position so as to decrease the pain in the lumbar area, and thus increasing the user's range of motion.

Briefly described according to one embodiment of the present invention, an improvement of U.S. Pat. No. 6,117,095, is provided having an inflatable lumbar support that would be readily adaptable for portable use if having an overall dimension of four feet (4') wide by seven (7') in length for a single user. Two users would have approximately seven to eight feet (7–8)' in width split in three and one-half feet (3'6") sections by seven feet (7') in length. In such an embodiment, either one person can lie on the back product or two at a time in different sections and corresponding hand devices and separate pumps. The product will also have raised side rails (for hands and arms) for additional comfort for the users. It is also envisioned that users may rotate body alignment so as to sit backwards within the unit, with the back adjacent to the leg support, thereby permitting a user to rest upright and watch television, read and/or assist in standing up. In addition, it is further envisioned that a large single sectioned product will be available for use in a bed, dimensioned between four (4) and eight (8) feet in width.

The lower back area will have two sections. One section for moist heat labeled in red and a cold pack section labeled in blue. The buttocks or saddle region will have a slight padded incline in the lower back area to prevent lower slippage and to elevate and anteriorly lift the T-11, T-12, L-1 spinal regions for support and comfort. The saddle will include material that will adhere to clothing and/or skin to further prevent lower slippage. The saddle inflates from a horizontal origin to a more vertical profile for more stretching and tilting by raising the legs. Once full of air, a plastic insert may be used for positioning and stabilization of the buttocks. The plastic insert will also be used so that the user's buttock does not sink into or otherwise deform the inflatable product. In addition, the plastic insert will have a padded material for adhering to the patients buttocks.

The leg area, near a person's knees, will include a plastic insert under the PVC material that will align with the middle of the leg portion, thereby stabilizing and preventing the legs from falling off the sides of the unit during inflation of the lumbar support. Thus, the inflated sides of the unit have a taller profile than the middle of the leg portion so that the leg-knee area is in comfort and does not allow the users legs to slip off the sides.

The entire back product will have an outside layer that is covering the inflatable product so that the product has a comfortable quality when in use. Stitch work and sewing will be necessary. Once deflated, occurring within approximately thirty (30) seconds, the product may be placed into a carrying case or container.

The improved pneumatic lumbar support (for a single user) will have two compartments. One compartment will cover the entire body laying down on the ground and/or bed. A first compartment is inflated by depressing a single button or switch, an entire lower portion inflating like an inflatable bed, with the saddle and the anterior tilt portion (rounded part corresponding approximately to T-11, T-12 and L-1) placing pressure and elevating the lower back like a lumbar cushion in a chair (creating anterior tilt). Deflation may be accomplished through depression of the same or a separate deflation button. A second compartment, encompassing the leg raiser, inflates the portion under the legs to raise the legs and knees, and also tilt the pelvis with a vertical movement of the saddle portion. Inflation of the second compartment will create the posterior tilt, stretch and release of posterior impingements. The second compartment may be raised from a substantially level and deflated state to approximately twenty to thirty inches (28"–30") in profile.

The improved pneumatic lumbar support (for two users) will be the same as the single user model, but instead of two compartments, there will be four compartments, two hand held devices of which will contain four buttons each, two different inflatable devices, and a divider longitudinally bisecting about the middle of the lumbar support. The division of the lumbar support into halves permits customized adjustment of the respective lumbar support divisions to particular user preferences. In addition, two hot pack sections and two cold pack sections are provided, a set of each hot and cold section for each respective division for twin users. This embodiment of the lumbar support is envisioned to be six feet to eight feet (6'–8') in width and seven feet (7') in length.

The improved pneumatic lumbar support is designed to satisfy all aspects of proper health care maintenance. The lumbar support is designed for home health, travelers, HMO participants, physical therapy regimens, chiropractic visitations, and to satisfy the requirements established by the plurality of health insurance companies currently available. The improved pneumatic lumbar support is to be used at home, in the office, while sleeping, vacation, traveling for work, exercising, stretching and other similar activities. The lumbar support is envisioned as lowering stress levels, strengthening variously target muscle groups, educating the consumer of proper spinal alignment, pain management, distracting the spine, releasing impinging atmospheres, increasing range of motion and/or simply relaxing, thus maintaining a posterior tilt position for a length of time.

A temperature control apparatus, such as a hot pack section or cold pack section, is located inside the lower back pad, corresponding and covering approximately the area between the T-4 and L-5 vertebrae of the user when lying on the mid to lower back extremity. It is also envisioned that a vibrational mechanism is included within the hot and cold section and controlled by the temperature control apparatus.

A leg-raising cushion rests flush against the floor and/or table top, and is used to raise the user's legs such that the thighs are oriented approximately 45–90 degrees upward in relation to the torso, depending on the height of the individual.

A hollow, inflatable bladder is located between the lower back pad and the leg-raising cushion, placing the three components in linear alignment.

The inflatable bladder contains a spinal indentation along the elongated centerline of the present invention, and at the lateral midline of the inflatable bladder. The spinal indentation is constructed to permit resting of the spinal column therein, thereby reducing pressure on the spinal column from the inflatable bladder. The spinal indentation continues linearly onto the lower back pad, with the indentation conforming and corresponding to the various spinal vertebrae lying on the lower back pad during use of the present invention.

Gripping protrusions or material are located on the upper, exterior surface of the inflatable bladder, and are designed to reduce downward sliding of the buttocks and to create a slight distraction of lower vertebrae on the inflatable bladder during inflation of the inflatable bladder.

When a user is positioned on the lumbar support, the inflatable bladder extends from the upper portion of the hamstring region of the leg to approximately the L-5 vertebrae, and is constructed such that inflation in the hamstring region causes a displacement greater than that of the buttocks region, allowing for more tilt of the lower spine. By inflating and deflating the inflatable bladder, the user can cause an anterior and posterior pelvic tilt, exercising and stretching the lumbar vertebrae and muscles. The user can also adjust the inflatable bladder so that the comfortable, normal resting position is achieved.

Pneumatic pressure to the inflatable bladder is provided by a portable electric air compressor. The electric air compressor may be remotely controlled by the user via a compressor control pad. The air compressor is powered by batteries, but traditional AC power is also envisioned.

Securement means extend from either side of the present invention, and are of sufficient length to wrap around a user's abdomen in the center of the lumbar region. Thus, the securement means secures the user to the present invention in order to ensure an effective treatment and to increase minimal distraction as the pelvic tilt is being performed. In one embodiment, securement means is envisioned as a belt or belt-type structure or mechanism.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
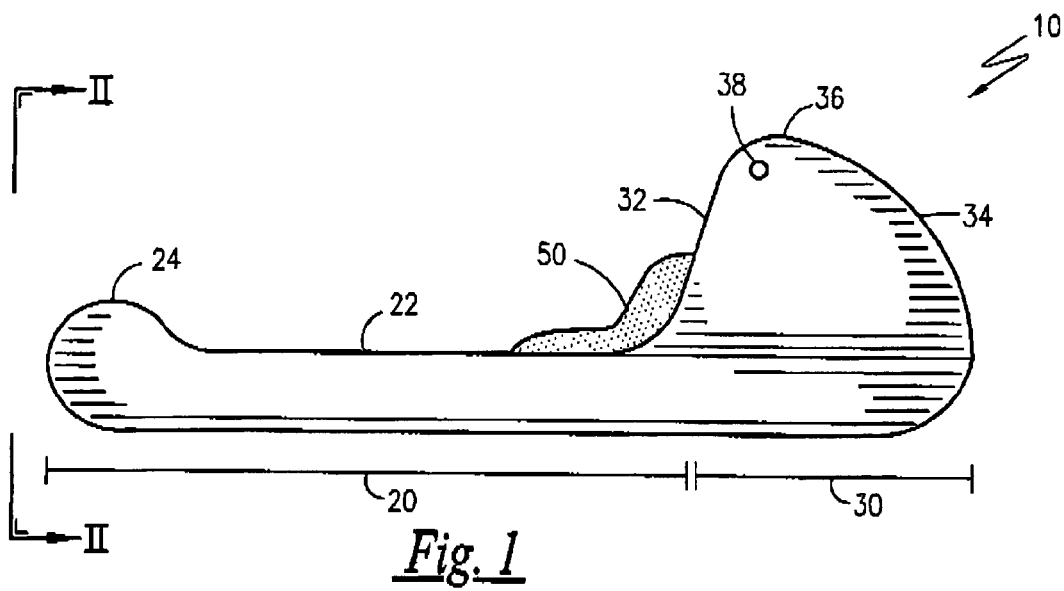
FIG. 1 is a side view of the lumbar support.
Figure 2:
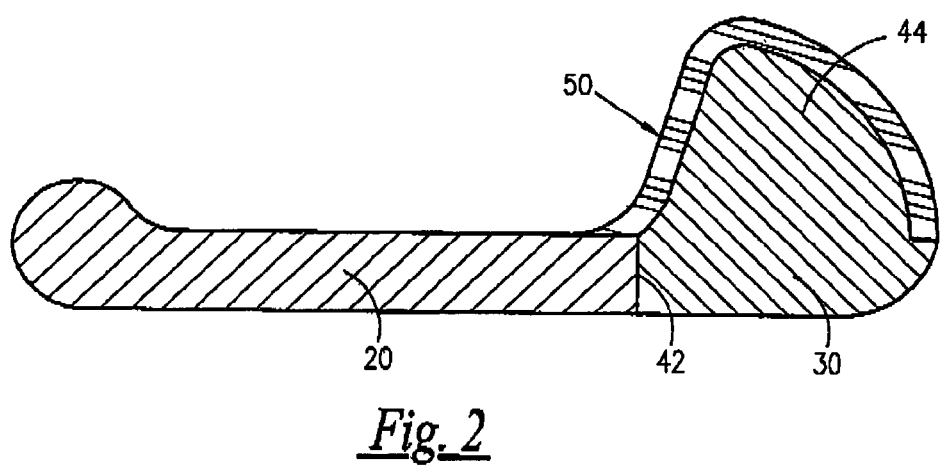
FIG. 2 is a partial sectional view of the lumbar support taken along line II—II.
Figure 3:
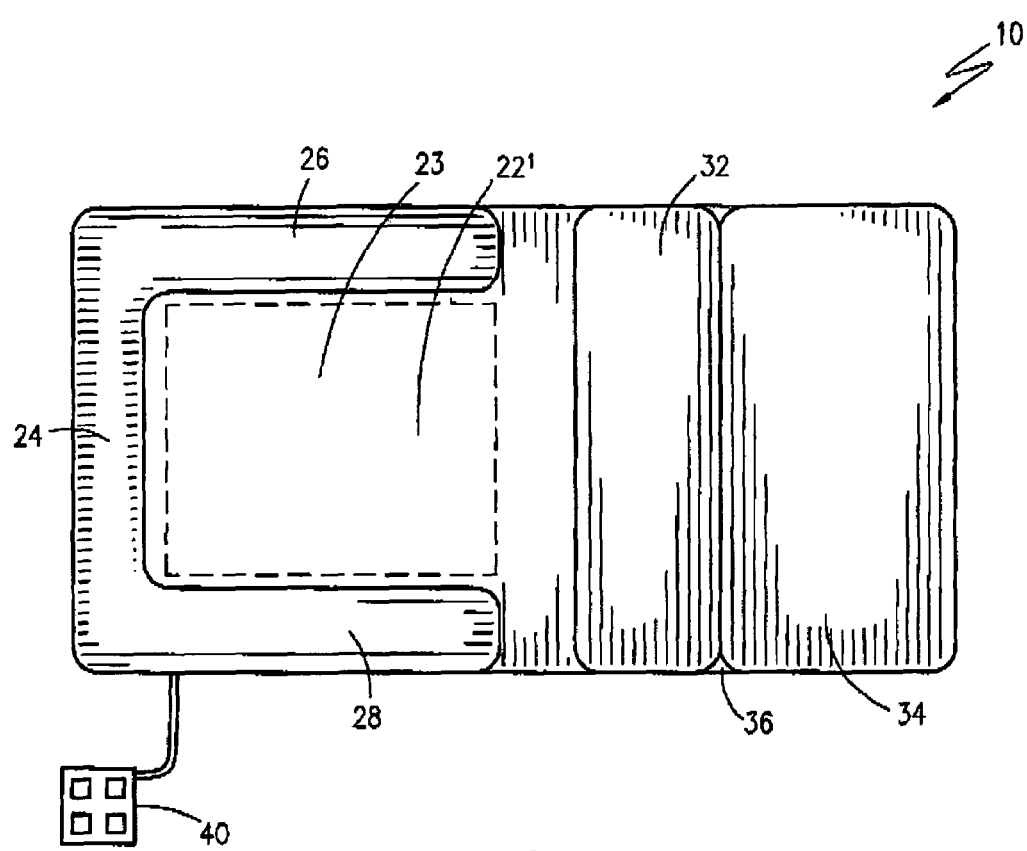
FIG. 3 top view of the lumbar support.

The best mode for carrying out the invention is presented in terms of its preferred embodiment, herein depicted within the FIGS. 1 through 3.

1. Detailed Description of the Figures

Referring now to FIG. 1 and FIG. 3, a portable and adjustable pneumatic lumbar support 10 is shown, according to a preferred embodiment of the present invention. The lumbar support 10 is designed to permit a user with chronic or acute back pain to select and subsequently lie in a customized neutral lumbar position so as to decrease the pain in the lumbar area, and to permit uninjured users to exercise and/or stretch the lumbar area for proper back care maintenance.

A lumbar support 10 is a portable device that rests on the ground or table top, a floor or bed, and allows a user to perform pelvic tilt exercises and to apply heat or cold therapy to the vertebrae of the spine. It is envisioned that the lumbar support 10 is constructed of a material selected from the group comprising rubber, plastic or vinyl, providing a flexible lumbar support 10 capable of repeated inflation and deflation, durability in transport and storage, and of a non-impact material so as not to damage walls, floors, furniture and other similar items during assembly and/or disassembly.

Referring now to FIG. 1 through FIG. 3, the lumbar support 10 comprises a back section 20 and an adjacent leg section 30, each section separately inflatable via an air compressor 40 (further described below) supplying air to a first bladder 42 (inflating the back section 20) and a second bladder 44 (inflating an anterior portion of the leg section 30). The back section 20 has a substantially flat, horizontally elongated, rectangular configuration upon which a user places the upper torso with the spine resting against the back section 20. The back section 20 further comprises a temperature control region 22 for actuation of hot and/or cold therapy treatments. The temperature control region 22 may have a variety of configurations, including the use of an integral pouch 22' into which a hot or cold pack may be slidably inserted for therapy treatments, and then removed once treatment is completed. It is further envisioned, as an alternative to the integral pouch 22', that the hot and cold therapy treatments are integral to the back section 20 as electrically controlled temperature settings, such as by a control apparatus, such as a thermostat 22", to designate the administration of heat or coldness through coils, or another similar mechanism. It is further envisioned, still, that a vibrating member 23 may be provided so as to provide a massage-like quality to the therapy, wherein the vibrating member is controlled by the thermostat (previously disclosed) with a separate activation and deactivation button or key for vibratory massage.

The back section 20 also includes an inflatable elevated band 24 provided at an end opposite to the leg section 30. The band 24 is intended to serve as a comfortable head rest mechanism when the user is lying with torso to the back section 20 and legs to the leg section 30, but it is also envisioned as functioning as a foot elevation mechanism if the user is lying in a reverse orientation, with torso resting against the leg section 30 and the legs against the back section 20. The back section 20 further includes a pair of lateral rails 26 and 28 positioned perpendicularly adjacent to the band 24 along the upper perimeter of the back section 20. Similar to the band 24, the pair of lateral rails 26 and 28 are inflatable and provide comfortable arm rests for the user while positioned within the lumbar support 10, and also providing means for the user to safely orient and remove themselves from the lumbar support 10 after therapy, relaxation and/or exercise is complete. As disclosed in FIG. 1, it is envisioned that the band 24 and the lateral rails 26 and 28 are a singular unit, forming a substantially U-shaped ring about the perimeter of back section 20 at an end opposite the leg section 30, although it is also envisioned that the band 24 and lateral rails 26 and 28 may each be a separate compartment that are separately inflatable.

The leg section 30 includes two exterior surfaces 32 and 34 converging to form an inclined configuration relative to the back section 20. The first exterior surface 32 has a substantially linear orientation. The second exterior surface 34 has an arcuate orientation. The first and second exterior surfaces 32 and 34 converge at a margin 36 intended to support the posterior of a user's knees, and may be further supported by a linearly elongated plastic insert 38 slidably inserted beneath the exterior surfaces 32 and 34. The linearly elongated plastic insert 38 provides added stability and rigidity to the margin 36, and is intended to prevent unnecessary deformity of the leg section 30, while also attempting to prevent the user's legs from sliding from the leg section 30 as inflation occurs. The amount of inflation provided to the leg section 30 permits the user to adjust the incline of the thighs, knees and lower legs between an orientation approximately 0° to 90° upward in relation to the user's torso, and depending on the height of the individual user. For the most common usage of the lumbar support 10 envisioned, the incline angle and orientation is envisioned as falling within the general range of 30° to 90° upward in relation to the user's torso.

The lumbar support 10 is manufactured from a nylon or nylon blended fabric, such as nylon with 420 denier weight, as an example. The fabric is covered in certain locations with a non-slip material 50, such as felt, codura or other similar material, thereby preventing unwanted slippage from specified body positions. The non-slip material 50 is envisioned as being most appropriately placed at the first and second exterior surfaces 32 and 34, thereby preventing slippage of the legs and/or buttocks when positioned for therapy or relaxation.

The air compressor 40 is envisioned as being integrally and operatively coupled with the first and second bladders 42 and 44, respectively, so that separate inflation of the bladders 42 and 44 may be accomplished. Separate actuation buttons may be provided for inflation and deflation corresponding to the respective bladders 42 and 44. Operative coupling between the compressor 40 and the bladders 42 and 44 may be accomplished through direct electrical coupling or by remote signal transmission, such as infra red or radio frequency transmissions.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

As the patient uses the pneumatic lumbar support, they will lie in a supine position (on their backs). Completely deflated, the patient lies against the back section 20 and resting the legs on the leg section 30. The lumbar support is inflated by actuation of the air compressor 40 via a control (either remote or integral). As the product inflates (to the patient's discretion-comfort level), the saddle will move from a horizontal position to a more vertical position. This will begin the distraction phase of the spine as well as release any impingements posteriorly. Furthermore, this posterior tilting will flex the lower spine stretching muscles in the lower back and allow the patient to locate their neutral natural position and alleviating the pain or spasms. In addition to lowering the pain this will, lower stress levels and educate the consumer of where they need to place their back for future comfort as well as increase range of motion and strengthen the body.

Envisioning this procedure, the patient, for additional comfort will previously slip either a hot or cold pack into the integral pouch 22' to alleviate various aches and pains as required. If the patient enjoys the posterior pelvic tilt they will increase the airflow with their remote control to full capacity, elevating the legs thus distracting the spine and stretching the lower back almost creating a 90—90 degree from the pelvis to the feet of the patient. If however, the patient feels more comfortable in an extension position, they will be allowed to inflate just the first section under the entire body first before the leg raise and place the body in an anterior tilt. While lying on the inflated product the patients that require anterior tilt will be able to remotely increase air in a certain section just underneath the L2–L5 region of the lower back. As the whole product inflates, the back portion will inflate first taking the patient off of the preexisting floor or bed while the anterior tilt becomes more prominent with increased influx of air. At this time, if the patient chooses to raise the leg portion for flexion and/or posterior tilting, they may that this time with another set of buttons on the same remote.

As the user finds their comfortable location on the Improved pneumatic lumbar support, they will be able to deflate and inflate the product at any time allowing for more comfortable positioning. Normally with lower back patients, they are not able to find a comfortable location for more that 15 minutes at a time thus allowing us to design the product so that they can manipulate the air pressure to certain degrees for different lengths of time to their discretion and comfort level.

The foregoing description is included to illustrate the operation of the preferred embodiment and is not meant to limit the scope of the invention. The scope of the invention is to be limited only by the following claims.

What is claimed is:

1. A portable and adjustable pneumatic lumbar support comprising:
   a back section comprising a substantially flat, horizontally elongated, rectangular configuration for a user's torso to rest, said back section further comprising a generally U-shaped ring about a perimeter of said back section comprising an elevated band and perpendicularly depending lateral rails, said band provided as a head rest, said lateral rails provided as arm rests;
   a leg section adjacent to said back section to support said user's legs, said leg section comprising a first exterior surface and a second exterior surface interfacing at a margin intended to support the posterior surface of said user's knees, said first exterior surface comprising a substantially linear orientation, said second exterior surface comprising a substantially arcuate orientation;
   a first bladder bounded by said back section, said first bladder inflated to support said user's torso therein;
   a second bladder bounded by said leg section, said second bladder inflated to support said user's legs therein;
   an air compressor integrally and operatively coupled with said first bladder and said second bladder, respectively, said air compressor selectively capable of separately inflating said first bladder and said second bladder; and
   a temperature control region integral to said back section, said temperature control region provided for administration of hot or cold therapy.

2. The portable and adjustable pneumatic lumbar support of claim 1 further comprising a vibratory member for providing massage therapy.

3. The portable and adjustable pneumatic lumbar support of claim 2, wherein said temperature control region and said vibratory member are operatively controlled by a control apparatus.

4. The portable and adjustable pneumatic lumbar support of claim 1, further comprising a linearly elongated plastic insert slidably placed into a cavity formed beneath said margin, said plastic insert provided for stabilizing said margin and preventing unnecessary deformity to said leg section.

5. The portable and adjustable pneumatic lumbar support of claim 1, wherein said temperature control region comprises an integral pouch, said pouch for slidably receiving a hot or cold therapy treatment.

6. The portable and adjustable pneumatic lumbar support of claim 1, wherein said temperature control region comprises integral hot and cold therapy treatment electrically controlled by a thermostat and coils.

* * * * *